(12) United States Patent
Yamagishi

(10) Patent No.: US 7,643,061 B2
(45) Date of Patent: Jan. 5, 2010

(54) SCINTILLATION MEASURING METHOD OF DISPLAY DEVICE AND SCINTILLATION MEASURING DEVICE

(75) Inventor: Eiichi Yamagishi, Shiojiri (JP)

(73) Assignee: Seiko Epson Corporation (JP)

( * ) Notice: Subject to any disclaimer, the term of this patent is extended or adjusted under 35 U.S.C. 154(b) by 429 days.

(21) Appl. No.: 11/516,185

(22) Filed: Sep. 6, 2006

(65) Prior Publication Data

US 2007/0052800 A1 Mar. 8, 2007

(30) Foreign Application Priority Data

Sep. 7, 2005 (JP) .............................. 2005-259593

(51) Int. Cl.
*H04N 5/225* (2006.01)
*H04N 7/00* (2006.01)
*H04N 7/18* (2006.01)
*G06K 9/00* (2006.01)
*G06F 3/038* (2006.01)

(52) U.S. Cl. .................. 348/207.99; 348/135; 348/189; 382/141; 382/108; 345/207

(58) Field of Classification Search ............ 348/92–97, 348/189, 190, 135, 207.99; 382/141, 145, 382/149, 154, 108, 251, 270; 345/207, 204, 345/690, 697
See application file for complete search history.

(56) References Cited

U.S. PATENT DOCUMENTS

| | | | | |
|---|---|---|---|---|
| 3,959,583 A * | 5/1976 | Judice et al. | ................. | 348/798 |
| 5,909,512 A * | 6/1999 | Ohshima et al. | ............. | 382/251 |
| 6,577,756 B1 * | 6/2003 | Furui | .......................... | 382/141 |
| 6,606,116 B1 * | 8/2003 | Poynter | ...................... | 348/189 |
| 6,697,515 B2 * | 2/2004 | Furui | .......................... | 382/141 |
| 6,982,744 B2 * | 1/2006 | Jenkins | ....................... | 348/189 |
| 6,983,067 B2 * | 1/2006 | Cox | .............................. | 382/145 |
| 7,079,676 B2 * | 7/2006 | Furui | .......................... | 382/141 |
| 2004/0155971 A1 * | 8/2004 | Sharma et al. | .............. | 348/239 |
| 2004/0252228 A1 * | 12/2004 | Waki et al. | ................... | 348/383 |

FOREIGN PATENT DOCUMENTS

| | | |
|---|---|---|
| JP | 07-027704 | 1/1995 |
| JP | 11-203446 | 7/1999 |

(Continued)

OTHER PUBLICATIONS

"Paint Quality Measurement", [on-line], Perceptron Asia Pacific Ltd., [retrieved on Aug. 17, 2005], Internet <URL: http://www.perceptron.co.jp/product/paint/autospect.html>.

(Continued)

*Primary Examiner*—Tuan Ho
*Assistant Examiner*—Marly Camargo
(74) *Attorney, Agent, or Firm*—Harness, Dickey & Pierce, P.L.C.

(57) ABSTRACT

A measuring method of scintillation appearing on a display image of a display device installed with a light source including: capturing the display image from a plurality of capturing positions respectively having different capturing angles relative to the display image to obtain a plurality of captured images; and acquiring scintillation by comparing pixels of the captured images each corresponding to a common pixel of the display image and acquiring data of pixels having different luminance as scintillation information.

8 Claims, 8 Drawing Sheets

FOREIGN PATENT DOCUMENTS

| | | |
|---|---|---|
| JP | 2001-264251 | 9/2001 |
| JP | 2003-279485 | 10/2003 |
| KR | 2000-0058081 | 9/2000 |

OTHER PUBLICATIONS

"Multi-Angle Image Colorimeter", [on-line], Kurabo Industries Ltd., [retrieved on Aug. 17, 2005], Internet <URL: http://www.kurabo.co.jp/el/af/afhl_01.html>.

* cited by examiner

SCINTILLATION MEASURING METHOD OF DISPLAY DEVICE AND SCINTILLATION MEASURING DEVICE

The entire disclosure of Japanese Patent Application No. 2005-259593, filed Sep. 7, 2005, is expressly incorporated by reference herein.

BACKGROUND

1. Technical Field

The present invention relates to a measuring method of scintillation appearing on a display image of a display device installed with a light source and to a scintillation measuring device.

2. Related Art

There have been widely used various types of display devices for displaying an optical image which is formed by modulating a source light in accordance with image information, the display devices being typically a CRT (Cathode Ray Tube), a liquid crystal display, a plasma display, an organic EL (electroluminescence) display, a projector and the like.

A person observing a display image on a display panel of a display device or a display image projected onto a screen sometimes senses a whitish bright scintillation in a part of the display image when the person slightly moves ones line of sight. The scintillation is considered to be caused by light-diffusion, reflection or the like generated by a light-diffusing member, a lens, etc. provided to the display panel. The scintillation is sensed when a pixel having a luminance higher than other parts exists in the display image. Since the scintillation is very minute and is not always sensed depending on a position for observing the display image, it is difficult to detect the scintillation simply by capturing and processing the display image.

With such background, a technology for measuring the scintillation has not been known.

Incidentally, in other fields, there has been known a technology for measuring a gloss of a painting surface of an automobile body (Document 1: JP-A-7-27704). Herein, by illuminating the painting surface using a light source device including a slit plate having a lot of slits arranged in parallel and a diffuser plate, an image of a parallel grid pattern is formed on the painting surface and the painting surface is captured. Then, a changing amount of a signal level changing in a direction orthogonal to the parallel grid pattern on the painting surface in the captured image is detected by an image processing device. Based on an inclination angle obtained by the changing amount of the signal level, the gloss of the paining surface is measured.

There has also been known a technology for measuring a surface quality of a painting surface, in which the painting surface is illuminated by an LED (Light Emitting Diode) light source and a reflection image reflected by the illumination are captured using a camera. Then, image processing is performed to measure gloss, sharpness and orange-peel of the painting surface based on: difference in luminance among pixels caused by difference of diffusion levels in the reflection image of the painting surface; variation in reflectivity at edges; and the like (Document 2: "Paint Quality measurement", [online], Perceptron Asia Pacific Ltd [retrieved on Aug. 17, 2005], Internet <URL: http://www.perceptron-.co.jp/product/paint/autospect.html>).

There has been known another technology for measuring a surface quality of a painting surface, in which the painting surface is illuminated at a plurality of angles, and images of the painting surface are captured for each of the illumination angles. Metallic, matt and orange-peel characteristics of the painting surface are measured based on difference in color between the captured images (Document 3: "Multi-Angle Image Colorimeter" [online], KURABO INDUSTRIES LTD., [retrieved on Aug. 17, 2005], Internet <URL: http://www.kurabo.cojp/el/af/afhl_01.html>).

Although there are technologies capable of measuring a surface quality of a painting surface as disclosed in Document 1 to 3, all of the technologies employ external light sources and cannot be applied to a measurement principle for measuring quality of a display image of a display device incorporating a light source (including a light emitter).

In recent information society, various display devices have been increasingly used for watching television programs, browsing the Internet, watching video software, while being used in presentations, conferences and exhibitions, which makes the display devices more and more important. Accordingly, further improvement of image quality of the display devices is demanded. It is required that a number of display devices with high image quality be provided in offices, cities, schools, homes, etc. with consistent quality.

In order to realize such demand, a predetermined scintillation quality needs to be ensured by performing an inspection for quantitatively measuring scintillation of display images in manufacturing the display devices.

In addition, it is desired to develop a display device free from generation of scintillation by utilizing quantitatively-measured scintillation levels.

SUMMARY

An object of the invention is to provide a measuring method of scintillation in a display image of a display device and a scintillation measuring device.

According to an aspect of the present invention, a measuring method of scintillation appearing on a display image of a display device installed with a light source, includes: capturing the display image from a plurality of capturing positions respectively having different capturing angles relative to the display image to obtain a plurality of captured images; and acquiring scintillation by comparing pixels of the captured images each corresponding to a common pixel of the display image and acquiring data of pixels having different luminance as scintillation information.

According to the aspect of the invention, by acquiring the scintillation information based on difference in luminance in corresponding pixels in the captured images captured at different angles, scintillation, which is sensed when a person observing the display image moves ones line of sight, can be detected. Accordingly, scintillation levels of the display image can be quantitatively measured based on the pixel data related to the scintillation information.

Here, the corresponding pixels refer to pixels corresponding to a common position of a display image in the plurality of captured images.

When being captured, the display image displayed on the display device is preferably displayed in a single color. For example a white image that allows a source light to be irradiated and allows a bright point to be easily recognized is preferable.

Incidentally, although two captured images may be enough, more numbers (i.e., three, four or more) of captured images captured at different angles enable measurement of scintillation that is sensed when the display image is seen from more numbers of directions.

In the measuring method according to the aspect of the invention, in the capturing, the captured images are captured by a plurality of capturing devices each disposed at each of the capturing positions.

According to the aspect of the invention, the plurality of capturing devices can capture the captured images from the plurality of capturing positions substantially simultaneously, thereby shortening a time required for the measurement of the scintillation.

In the measuring method according to the aspect of the invention, in the capturing, the captured images are captured by a capturing device that moves between the capturing positions in sequence.

According to the aspect of the invention, the plurality of captured images can be obtained by performing capturing plural number of times using at least one capturing device, thereby simplifying an arrangement of a device used for the measurement of the scintillation.

In the measuring method according to the aspect of the invention, in the capturing, an angle difference between the capturing angles of the capturing positions is in the range from 1° to 10°.

According to the aspect of the invention, since the difference in the capturing angles of the captured images is in the range from 1° to 10°, the measurement of scintillation can be performed reliably.

Specifically, since the scintillation is sensed when a person observing the display image slightly moves ones line of sight, when the difference in the capturing angles of the captured images to be compared is smaller than 10 or larger than 10°, it becomes difficult to obtain the difference in luminance of the corresponding pixels in the captured images.

In the measuring method according to the aspect of the invention, in the capturing, the display image is captured with a marker pattern displayed thereon to obtain the captured images. In acquiring the scintillation, positions of the marker patterns in the captured images are matched with each other, and pixels located at a common position in the captured images are compared as the corresponding pixels.

According to the aspect of the invention, since correction of positions between the captured images is performed using the marker patterns, comparison between the corresponding pixels in the captured images can be facilitated.

Incidentally, a form of the marker pattern may be exemplified by, for instance, those having a rectangular-frame shape and positioned at each corner of a rectangular display image.

In the measuring method according to the aspect of the invention, in acquiring the scintillation, subtraction processing between the captured images is performed to obtain the scintillation information.

According to the aspect of the invention, difference in the corresponding pixels in the captured images can be obtained immediately by performing subtraction between the captured images, thereby facilitating the comparison between the captured images.

In the measuring method according to the aspect of the invention, in acquiring the scintillation, data of pixels that has a difference in luminance equal to or higher than a predetermined threshold value in the comparison of the corresponding pixels is extracted from the scintillation information.

According to the aspect of the invention, the scintillation information excludes pixel data in which difference in luminance is smaller than the threshold value and therefore is not sensed as the scintillation when observed and pixel data in which the difference in luminance is generated due to the difference in the capturing angles, thereby optimizing evaluation of the scintillation.

In the measuring method according to the aspect of the invention, in acquiring the scintillation, a scintillation value is obtained based on a planer dimension of the pixels in the scintillation information.

According to the aspect of the invention, the scintillation value is obtained using the planar dimension the pixels of the pixel data acquired as the scintillation information based on the difference in luminance. Even when the difference in luminance is large, the scintillation value becomes small for a small planar dimension, whereas even when the difference in luminance is small, scintillation value becomes large for a large planar dimension. Accordingly, using the planar dimension in addition to the difference in luminance in measurement of scintillation, evaluation of the scintillation can be optimized.

According to another aspect of the present invention, a measuring device of scintillation appearing on a display image of a display device installed with a light source includes: a capturing device that captures the display image from a plurality of capturing positions respectively having different capturing angles relative to the display image to obtain a plurality of captured images; and a scintillation acquirer that acquires scintillation by comparing pixels of the captured images each corresponding to a common pixel of the display image and acquiring data of pixels having different luminance as scintillation information.

According to the aspect of the invention, by comparing the captured images of the display image captured at different angles, scintillation of the display image, which is likely sensed when a person observing the display image moves ones line of sight, can be detected from the difference in the captured images. Accordingly, the scintillation level of the display image can be quantitatively measured based on difference of the captured images or the like.

Incidentally, the scintillation acquirer of the above-described scintillation measuring device may either be realized as hardware or a measuring program.

In a case with the measuring program, a computer installed in the scintillation measuring device may be functioned as the scintillation acquirer.

With the arrangement, the same advantages as those of the above-described measuring method of scintillation and scintillation measuring device can be attained.

Herein, the measuring program may be installed in the computer directly or via a computer-readable recording medium storing the program.

By incorporating such measuring program in an existing image display device, a function for measuring the scintillation can be realized easily at low cost.

BRIEF DESCRIPTION OF THE DRAWINGS

The invention will be described with reference to the accompanying drawings, wherein like numbers reference like elements.

DESCRIPTION OF EXEMPLARY EMBODIMENT(S)

First Exemplary Embodiment

A first exemplary embodiment of the invention will be described below with reference to the attached drawings.

1 Overall Arrangement

Figure 1:
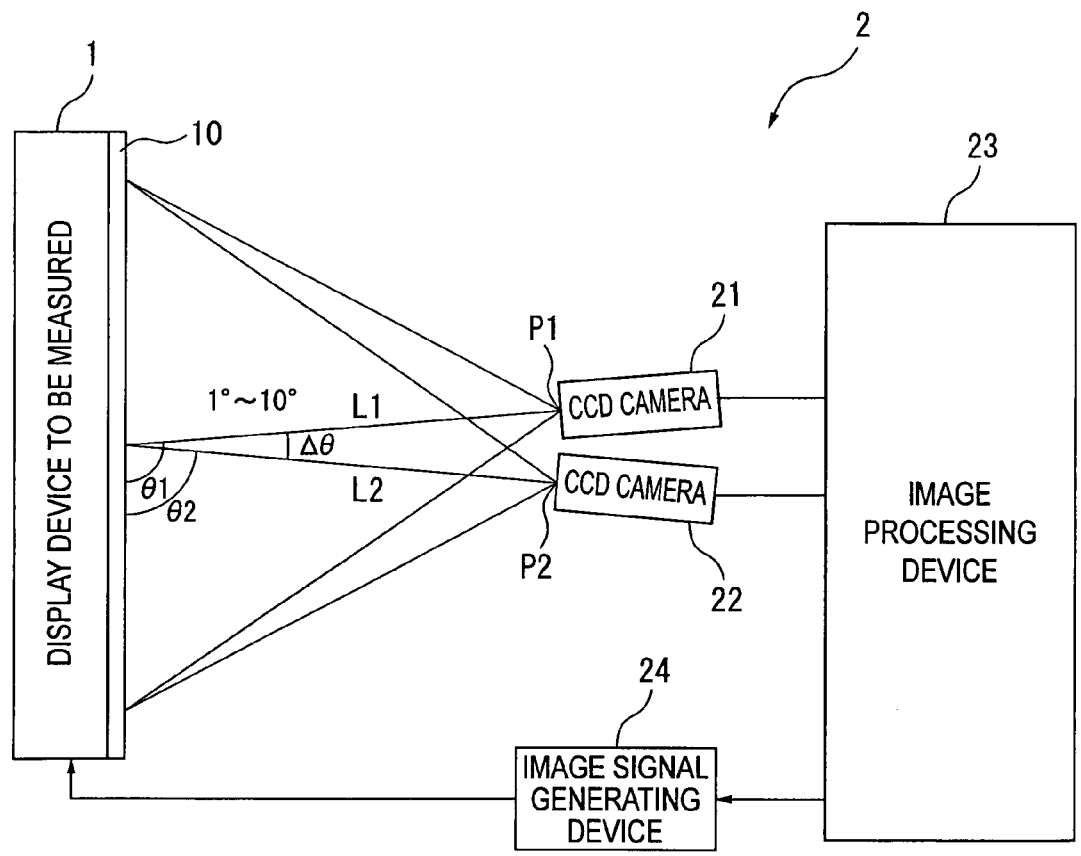
FIG. 1 shows a diagram showing an outline of a scintillation measuring device according to a first exemplary embodiment of the invention.

FIG. 1 shows an outline of a scintillation measuring device 2 for measuring scintillation appearing on a display image of a display device 1 in the first exemplary embodiment.

In FIG. 1, the display device 1 is shown as a side view in a simple manner, the display device 1 being a liquid crystal display having a display panel 10 on a front side thereof. Note that the display device 1 may be a plasma display, an organic EL display, a CRT or a rear projector that projects a display image from the inside of a casing onto a screen panel, the casing disposed on the rear side of the screen panel. In addition, the display device 1 may be a front-projection type projector that projects a display image onto a screen provided on a wall or the like via a projection lens.

Figure 2:
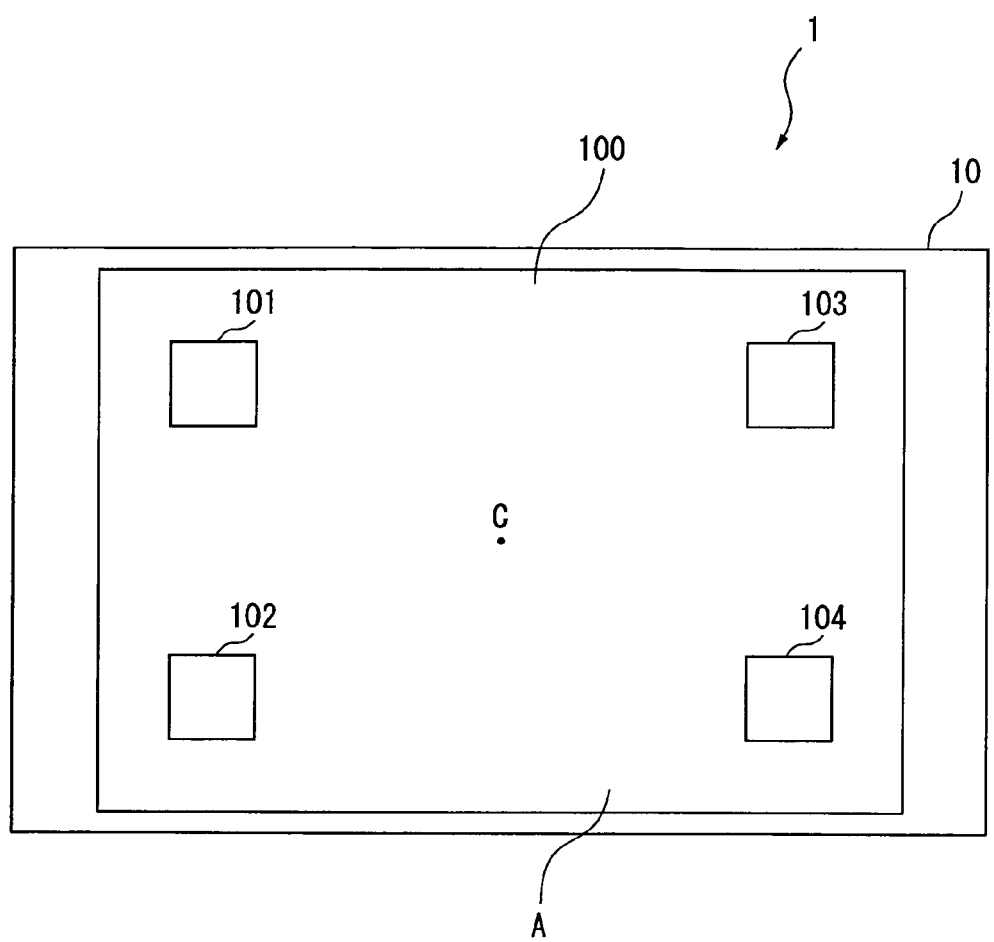
FIG. 2 is a plan view showing a display image of a display device as an object for scintillation measurement according to the first exemplary embodiment.

FIG. 2 is a front view of the display device 1, which shows a substantially rectangular display image 100 displayed on the display panel 10. Marker patterns 101 to 104 having square-frame shapes are each displayed on each of the four corners of the display image 100.

Referring back to FIG. 1, the scintillation measuring device 2 includes: two CCD (Charge Coupled Devices) cameras 21, 22 as capturing devices for capturing the display image 100 of the display device 1 (FIG. 2); an image processing device 23 for processing captured images captured by the CCD cameras 21, 22; and an image signal generating device 24 for generating an image signal and transmitting the image signal to the display device 1.

The image signal generating device 24 generates the image signal of the display image 100 including the marker patterns 101 to 104 and feeds a constant image signal to the display device 1 during measurement of scintillation.

Herein, in the image signal generated by the image signal generating device 24, all pixels have a uniform luminance in a measurement area A except the marker patterns 101 to 104 (the measurement area A including inner sides of the frames of the marker patterns 101 to 104). In the first exemplary embodiment, the measurement area A is a single-color image of white and has a uniform image component.

The CCD cameras 21, 22 are disposed confronting the display image 100 in the vicinity of the center C of the display image 100 of the display device 1 (FIG. 2). The CCD cameras 21, 22 are set to have a field for capturing the entire display image 100 and have a uniform magnification.

The CCD cameras 21, 22 are disposed so as to be shifted from each other in a vertical direction (an up-down direction in FIG. 1) of a plane of the display image 100 (FIG. 2). Lines connecting the positions of the CCD cameras 21, 22 (capturing positions P1, P2) and the center C of the display image 100 are defined as lines of sight L1, L2. Angles formed by the lines of sight L1, L2 and the plane of the display image 100 are defined as capturing angles θ1, θ2. An angle difference Δθ of the capturing angles θ1, θ2 may be arbitrarily set in the range from 1° to 10°.

Incidentally, although the CCD cameras 21, 22 are disposed at positions substantially confronting the center C of the display image 100 in the first exemplary embodiment, the CCD cameras 21, 22 may be disposed at oblique positions of the display image 100.

2 Arrangement of Image Processing Device

Figure 3:
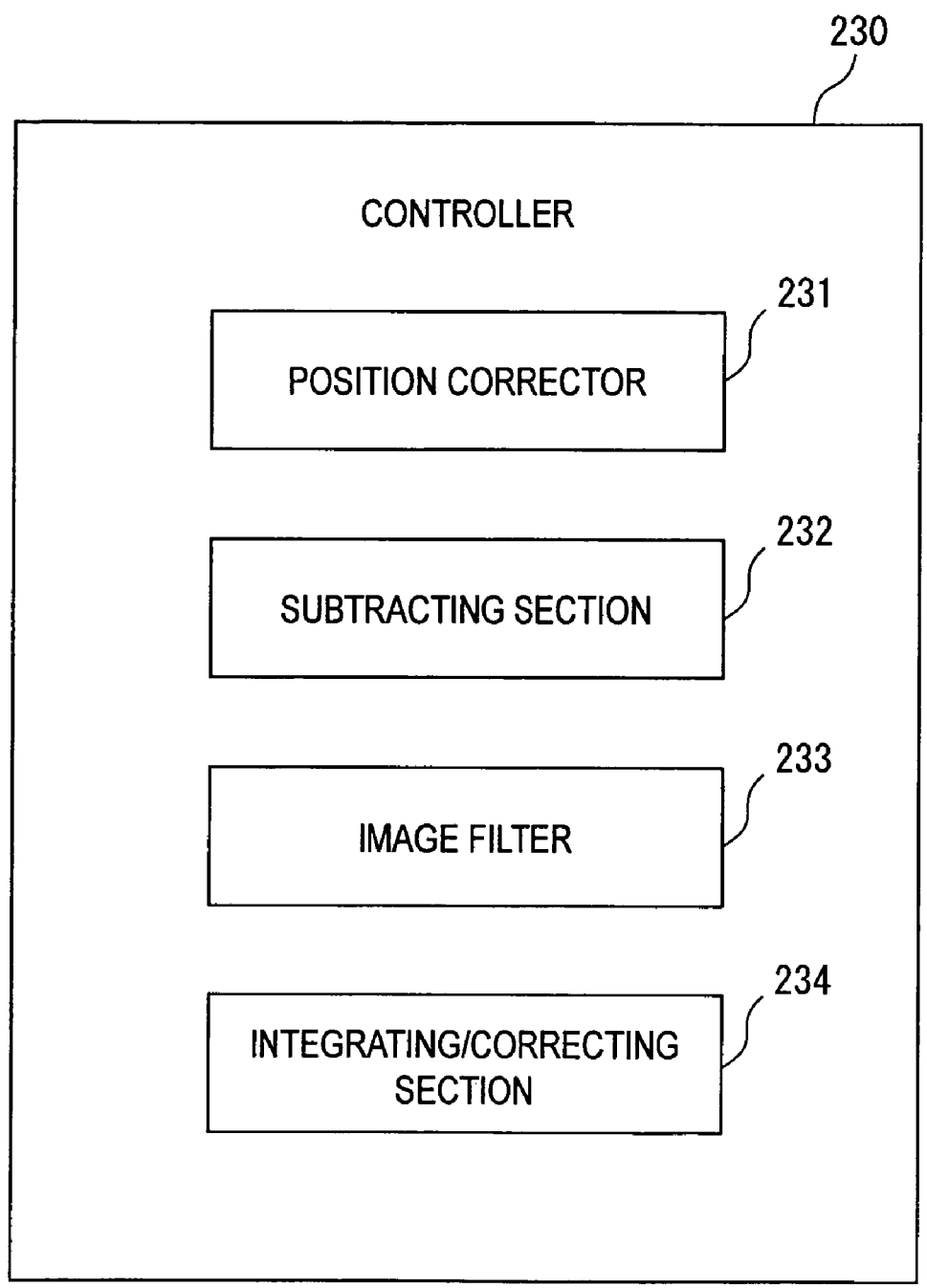
FIG. 3 is a block diagram showing an arrangement of an image processing device according to the first exemplary embodiment.

FIG. 3 is a block diagram showing an arrangement of the image processing device 23.

The image processing device 23 includes: a position corrector 231 for correcting positions in captured images of the CCD cameras 21, 22 (FIG. 1); a subtracting section 232 for performing subtraction between the capture image of the CCD camera 21 and the captured image of the CCD camera 22; an image filter 233 for filtering and correcting data obtained by the subtraction; and an integrating/correcting section 234 for integrating and correcting data in scintillation information acquired by the filtering. The members 231 to 234 are each read and executed by a controller 230 such as a CPU.

The position corrector 231, the subtracting section 232, the image filter 233 and the integrating/correcting section 234 constitute the scintillation acquirer of the invention.

3 Scintillation Measurement Procedure

Next, measurement procedure using the scintillation measuring device 2 having the above-described arrangement will be described.

3-1 Capturing Process

First, the CCD cameras 21, 22 capture the display image 100 substantially simultaneously, and the captured images are imported in the image processing device 23.

Figure 4A:
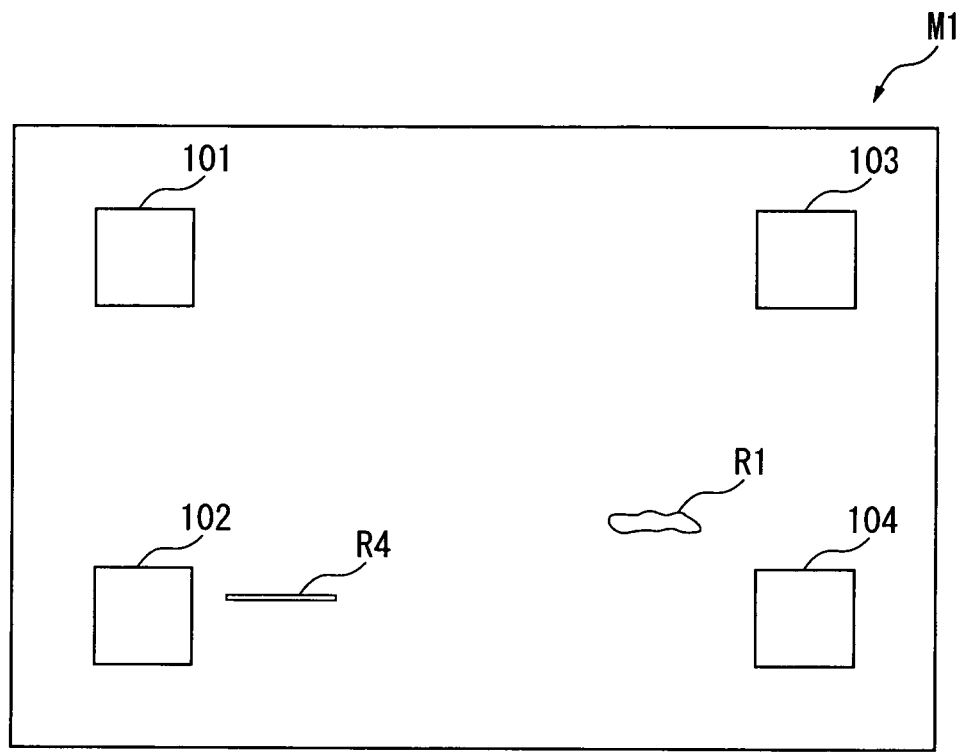
FIG. 4A is a diagram showing a captured image M1 according to the first exemplary embodiment.
Figure 4B:
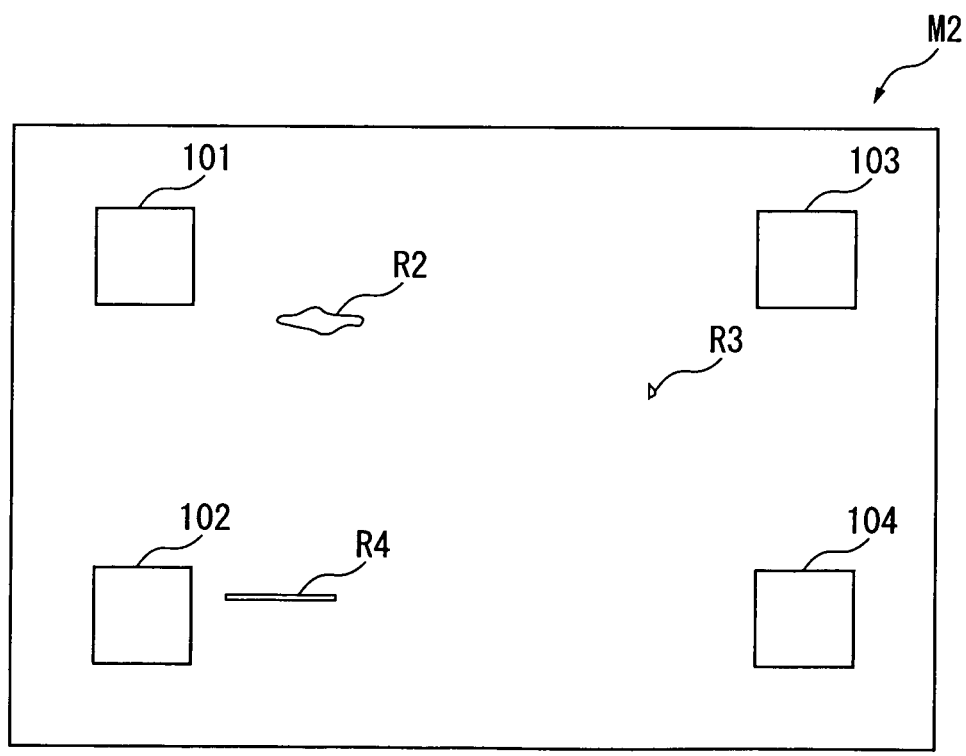
FIG. 4B is a diagram showing a captured image M2 according to the first exemplary embodiment.

In the first exemplary embodiment, captured images M1, M2 as shown in FIGS. 4A and 4B are obtained.

3-2 Scintillation Acquiring Process

The captured images M1, M2 of the CCD cameras 21, 22 are processed by the image processing device 23, so that scintillation of the display image 100 is acquired as scintillation information.

Figure 5:
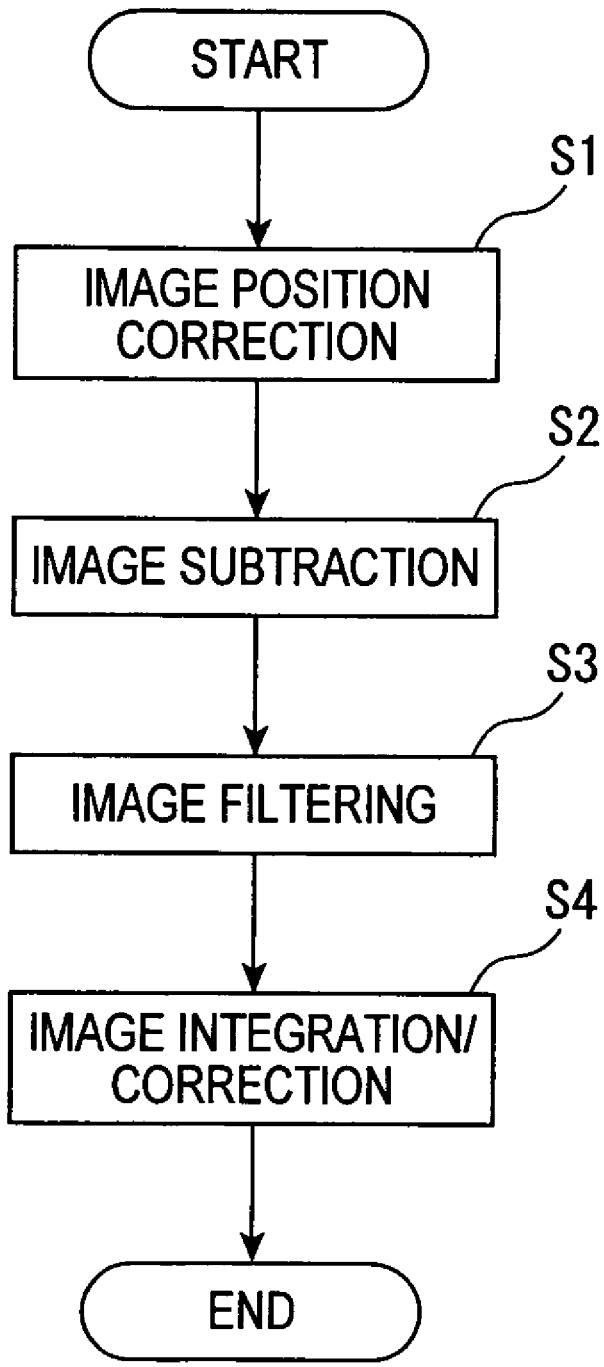
FIG. 5 is a flowchart showing processing performed by the image processing device according to the first exemplary embodiment.

FIG. 5 is a flowchart showing processing performed by the image processing device 23.

In acquiring the scintillation, the position corrector 231 corrects positions of the captured images M1, M2 captured by the CCD cameras 21, 22 (S1). At this time, the position corrector 231 acquires information of the marker patterns 101 to 104 from the image signal generating device 24 and matches mutual positions and sizes of the marker patterns 101 to 104 in the captured images M1, M2 (FIGS. 4A and 4B). Due to such operation, pixels at corresponding positions (corresponding pixels) in the captured images M1, M2 indicate the same positions in the display image.

Figure 6:
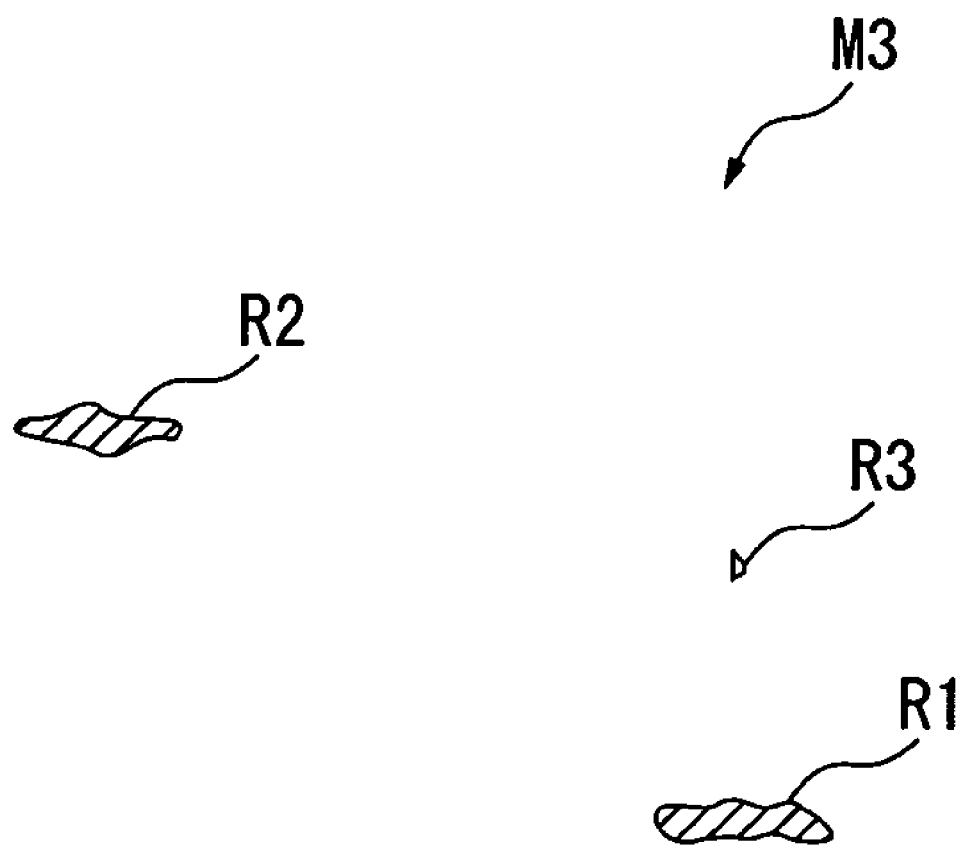
FIG. 6 is a diagram showing difference information between the captured images according to the first exemplary embodiment.

After the positions of the captured images M1, M2 are corrected, the subtracting section 232 performs subtraction processing between the captured images M1 and M2 in order to obtain difference information (S2). As shown in FIGS. 4A and 4B, the captured images M1, M2 include: an area R1 that exists in the captured image M1 but not in the captured image M2; areas R2, R3 that exist in the captured image M2 but not in the captured image M1; and an area R4 that exists in both of the captured images M1, M2. By performing the subtraction processing of the captured images M1, M2, difference information M3 in which only pixel data having different luminance is extracted can be obtained as shown in FIG. 6. The difference information M3 includes the areas R1, R2, R3 but not the area R4.

Note that, in FIGS. 4A, 4B and 6, the areas R1, R2, etc. are shown in an enlarged manner. These areas are actually so minute that they are not sensed by a person observing the display image 100 instantaneously. Also, sizes, appearing positions and the number of the areas R1, R2, etc. are not consistent.

Figure 7A:
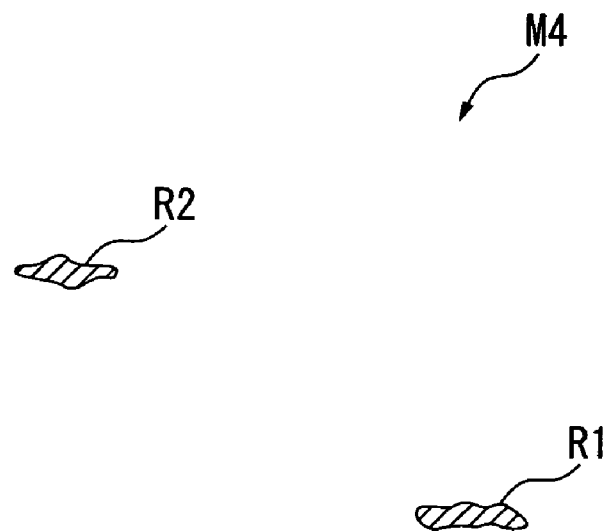
FIG. 7A is a diagram showing scintillation information according to the first exemplary embodiment.
Figure 7B:
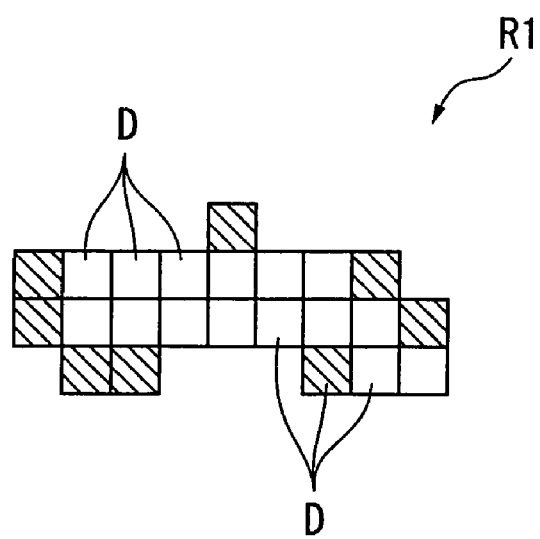
FIG. 7B is a partially enlarged view of FIG. 7A.

Next, the difference information M3 is corrected by the image filter 233 (S3). The image filter 233 is a so-called smoothing filter. The image filter 233 eliminates difference information M3 corresponding to the area R3 that has been extracted due to an error or the like of digital subtraction performed by the subtracting section 232, while extracting only data that can be evaluated as the scintillation. Consequently, as shown in FIG. 7A, scintillation information M4 including the areas R1, R2 can be obtained.

As shown in 7B, which shows the area R1 as an example, the areas R1, R2 include a plurality of pixels D having different luminance.

Next, the integrating/correcting section 234 extracts a pixel D having luminance higher than a predetermined threshold value from the plurality of pixels D in the areas R1, R2 of the scintillation information M4, while integrating the planar dimension of the extracted pixel D (S4).

By correcting the integrated value of the planar dimension of the extracted pixel D as needed, a scintillation value can be obtained. Using the scintillation value, image quality of the display device 1 can be quantitatively evaluated. Further, the scintillation value can be utilized for developing display devices free from generation of scintillation.

According to the first exemplary embodiment described above, the following advantages can be obtained.

1 The scintillation measuring device 2 obtains the captured images M1, M2 captured at different angles relative to the display image 100 of the display device 1 and acquires the scintillation information M4 including difference in luminance of the pixels D in the captured images M1, M2, so that the scintillation in the display image 100 that is sensed when a person observing the display image 100 moves ones line of sight can be detected. Accordingly, the scintillation value of the display image 100 can be quantitatively measured based on the planar dimension of the pixel D contained in the scintillation information M4.

2 The scintillation measuring device 2 includes a plurality of CCD cameras 21, 22. Since these CCD cameras 21, 22 can capture the captured images M1, M2 from a plurality of capturing positions P1, P2 substantially simultaneously, thereby shortening a time required for the scintillation measurement.

3 The CCD cameras 21, 22 are so set that the angle difference Δθ of the capturing angles θ1, θ2 relative to the display image 100 is in the range from 1° to 10°. With the arrangement, the scintillation appearing on the display image 100 can be properly recognized under a condition similar to the case where the scintillation is sensed when a person observing the display image slightly moves ones line of sight, thereby reliably conducting the scintillation measurement.

4 The display image 100 is captured with the marker patterns 101 to 104 being displayed, and positions of the captured images M1, M2 are corrected using the marker patterns 101 to 104 in the captured images M1, M2. Therefore, comparison of the corresponding pixels of the captured images M1, M2 can be facilitated.

5 In acquiring the scintillation information M4, difference in the corresponding pixels of the captured images M1, M2 can be obtained quickly by the subtraction processing of the captured images M1, M2 (S2). Therefore, comparison of the captured images M1, M2 can be facilitated.

6 The pixel D having the luminance of a predetermined level or higher is extracted from the scintillation information M4 and only the extracted pixel D is used to obtain the scintillation value. With the arrangement, pixel data which has the luminance smaller than the predetermined level and therefore is not sensed as the scintillation when the display image is observed and pixel data in which the difference of luminance is generated due to the difference in the captured angles are excluded, thereby optimizing evaluation of the scintillation.

7 In obtaining the scintillation value, since the planar dimension of the pixel D is used, quantification of the scintillation can be facilitated, and the evaluation of the scintillation can be facilitated.

Second Exemplary Embodiment

Now, the second exemplary embodiment of the invention will be exemplified.

In the description below, the same reference numerals will be attached to the structures and components which are the same as the first exemplary embodiment to omit or simplify the detailed description thereof.

Figure 8:
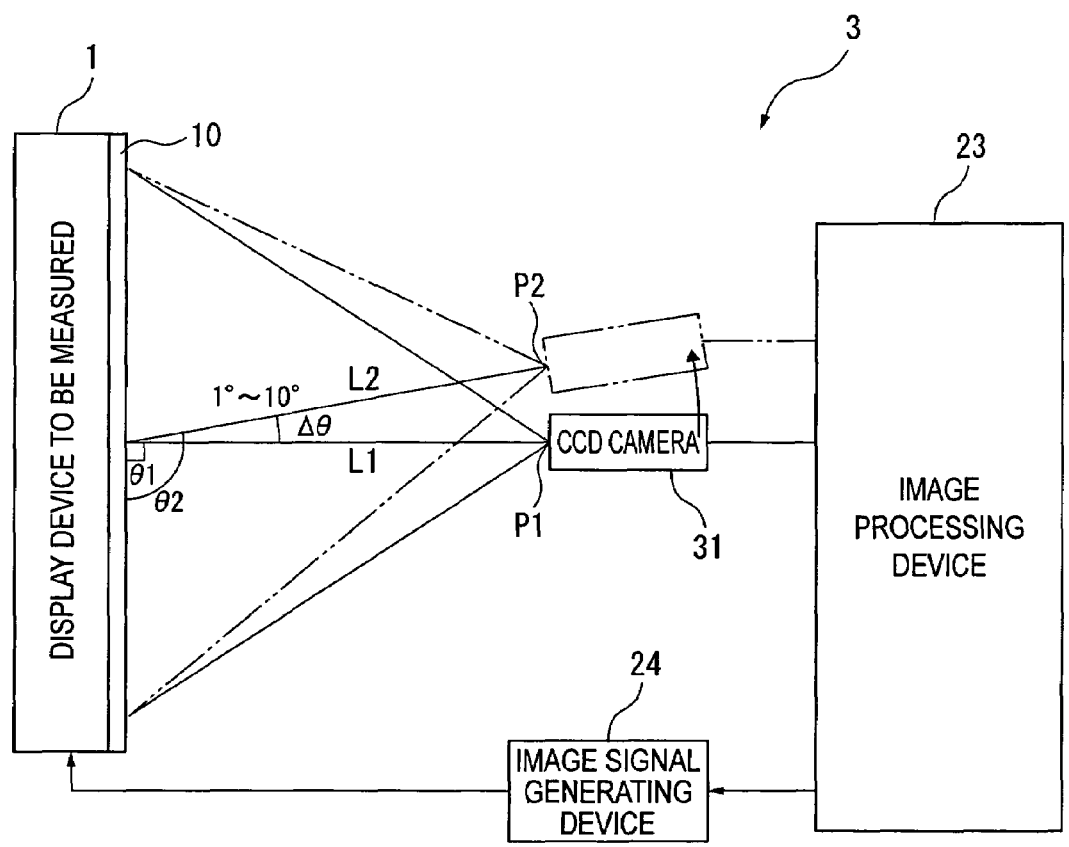
FIG. 8 shows a diagram showing an outline of a scintillation measuring device according to a second exemplary embodiment of the invention.

FIG. 8 is a diagram showing an outline of a scintillation measuring device 3 of the second exemplary embodiment.

While the scintillation measuring device 2 (FIG. 1) of the first exemplary embodiment includes two CCD cameras 21, 22, the scintillation measuring device 3 of the second exemplary embodiment only includes one CCD camera 31. Other arrangements of the scintillation measuring device 3 are substantially the same as those of the scintillation measuring device 2 of the first exemplary embodiment.

The CCD camera 31 is movable in a vertical direction of the display image 100 (FIG. 2) by a moving section (not shown) so as to be stopped at capturing positions P1, P2 each confronting the center C of the display image 100 of the display device 1.

A capturing angle θ1 formed by a line of sight L1 connecting the capturing position P1 with the center C of the display image 100 and the plane of the display image 100 is 90°. A capturing angle θ2 formed by a line of sight L2 connecting the capturing position P2 with the center C of the display image 100 and the plane of the display image 100 is 100°. An angle difference Δθ between the capturing angles θ1 and θ2 is set to 10° in the second exemplary embodiment. Note that the angle difference Δθ can be set in the range from 1° to 10°.

With the arrangement, when capturing the display image 100 of the display device 1 to measure the scintillation, the CCD camera 31 is stopped at the capturing position P1 to capture a captured image M1 and then moved to and stopped at the capturing position P2 to capture a captured image M2.

The image processing device 23 imports the captured images M1, M2 to process them in a manner similar to the first exemplary embodiment, thereby quantitatively measuring the scintillation appearing on the display image 100.

According to the second exemplary embodiment, the following advantage can be obtained in addition to the advantages of 1 and 3 to 7 described above.

8 The CCD camera 31 is movable between the capturing images P1 and P2, and the captured images M1, M2 can be obtained by capturing the display image plural number of times using the CCD camera 31. Accordingly, the scintillation measuring device 3 does not have to include a plurality of cameras, thereby simplifying the arrangement thereof.

Modification of Invention

Incidentally, the invention is not limited to the first and second exemplary embodiments above, but includes modifications and improvements as long as the object of the invention can be achieved.

For example, the display image 100 is captured from the capturing positions P1, P2 that are set at different angles in the vertical direction of the rectangular display image 100 (FIG. 2) in the first and second exemplary embodiments. However, the arrangement is not limited thereto, and the display image 100 may be captured from capturing positions that are set at different angles in a horizontal direction or in a diagonal direction of the display image 100, and captured images from those capturing positions may be used in measuring the scintillation.

Although the CCD cameras have a uniform magnification and are set to have a field for capturing the rectangular area of the display image 100 in the first exemplary embodiment, the arrangement is not limited thereto. Cameras having different magnifications and fields may also be used. In such case, positions between the captured images can be corrected using the marker patterns or the like.

Further, other types of capturing device may be employed without limiting to the CCD camera.

The arrangement of the marker patterns that are displayed in the display image for correcting positions between the captured images is not limited to that described in the first and second exemplary embodiments. The marker patterns may be graphic such as a rectangle, a triangle and a line and may even be a pattern using a character or the like. In addition, a display position and the number of marker patterns may be arbitrarily set.

Incidentally, the positions between the captured images may alternatively be corrected based on, for instance, positions of black matrices in a liquid crystal display panel instead of using the marker patterns.

Although the number of capturing positions for capturing the display image is two in the first and second exemplary embodiments, the number may be three, four or even more. Captured images captured from more numbers of capturing positions having different capturing angles enable measurement of scintillation that is sensed when the display image is seen from more numbers of directions.

In such case, suppose three capturing positions P1, P2, P3 relative to the display image 100 are disposed in the order of mention along the vertical direction of the display image 100 (FIG. 2), captured images from the capturing position P1 and P2, those from P2 and P3, and those from P1 and P3 can be respectively compared.

In a case where image quality of the display device is improved due to the scintillation value obtained according to the invention and the scintillation is reduced to leave only very minute scintillations that are difficult to be measured, resolving power can be enhanced by capturing the display image 100 plural number of times with the CCD cameras 21, 22 of the first exemplary embodiment and integrating captured image data obtained in the capturing. By performing the image processing such as the subtraction processing on the data obtained by the integration for each of the CCD cameras 21, 22, even the very minute scintillations can be measured.

It should be noted that although the best mode and method for implementing the invention have been disclosed above, the invention is not limited thereto. In other words, while the invention has been mainly illustrated and described on the specific exemplary embodiments, a person skilled in the art can modify the arrangements such as shape, material, quantity and the like of the above-described exemplary embodiments without departing from the technical idea and scope of the invention.

Therefore, the description limiting the shapes, the materials and the like disclosed above is intended to be illustrative for easier understanding but not to limit the invention, hence the invention includes the description using a name of component without a part of or all of the limitation on the shape, the material and the like.

What is claimed is:

1. A measuring method of scintillation appearing on a display image of a display device installed with a light source, the method including:
   capturing the display image from a plurality of capturing positions respectively having different capturing angles relative to the display image to obtain a plurality of captured images; and
   acquiring scintillation by comparing pixels of the captured images each corresponding to a common pixel of the display image and acquiring data of pixels having different luminance as scintillation information, wherein
   in the capturing, the display image is captured with a marker pattern displayed thereon to obtain the captured images, and
   in aquiring the scintillation, positions of the maker patterns in the captured images are matched with each other, and pixels located at a common position in the captured images are compared as the corresponding pixels.

2. The measuring method according to claim 1, wherein in the capturing, the captured images are captured by a plurality of capturing devices each disposed at each of the capturing positions.

3. The measuring method according to claim 1, wherein in the capturing, the captured images are captured by a capturing device that moves between the capturing positions in sequence.

4. The measuring method according to claim 1, wherein in the capturing, an angle difference between the capturing angles of the capturing positions is in the range from 1° to 100°.

5. The measuring method according to claim 1, wherein in acquiring the scintillation, subtraction processing between the captured images is performed to obtain the scintillation information.

6. The measuring method according to claim 1, wherein in acquiring the scintillation, data of pixels that has a difference in luminance equal to or higher than a predetermined threshold value in the comparison of the corresponding pixels is extracted from the scintillation information.

7. The measuring method according to claim 1, wherein in acquiring the scintillation, a scintillation value is obtained based on a planer dimension of the pixels in the scintillation information.

8. A measuring device of scintillation appearing on a display image of a display device installed with a light source, the device including:
   a capturing device that captures the display image from a plurality of capturing positions respectively having different capturing angles relative to the display image to obtain a plurality of captured images; and a scintillation acquirer that acquires scintillation by comparing pixels of the captured images each corresponding to a common pixel of the display image and acquiring data of pixels having different luminance as scintillation information, wherein in the capturing device, the display image is captured with a marker pattern displayed thereon to obtain the captured images, and in the scintillation acquirer, positions of the marker patterns in the captured images are matched with each other, and pixels located at a common positions in the captured images are compared as the corresponding pixels.

* * * * *